US009618395B2

(12) United States Patent
Ozaki et al.

(10) Patent No.: US 9,618,395 B2
(45) Date of Patent: Apr. 11, 2017

(54) TEMPERATURE DETECTING CIRCUIT

(71) Applicant: HONDA MOTOR CO., LTD., Tokyo (JP)

(72) Inventors: Hiroyasu Ozaki, Wako (JP); Koichi Takaku, Wako (JP); Taneaki Miura, Wako (JP); Koichi Kato, Wako (JP); Saneto Asano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 641 days.

(21) Appl. No.: 14/072,790

(22) Filed: Nov. 6, 2013

(65) Prior Publication Data
US 2014/0126608 A1    May 8, 2014

(30) Foreign Application Priority Data

Nov. 8, 2012 (JP) .................................. 2012-246454

(51) Int. Cl.
*G01K 7/22* (2006.01)
*G01K 7/25* (2006.01)

(52) U.S. Cl.
CPC ...... *G01K 7/22* (2013.01); *G01K 7/25* (2013.01)

(58) Field of Classification Search
CPC ........................................................ G01K 7/22
USPC ........... 374/170, 183, 185, 163; 702/130, 99
See application file for complete search history.

(56) References Cited

U.S. PATENT DOCUMENTS

| 3,248,892 | A | * | 5/1966 | Sutton | F25D 21/006 307/117 |
| 3,576,472 | A | * | 4/1971 | Marshall, III | G01P 13/006 340/606 |
| 4,035,787 | A | * | 7/1977 | Hornung | A47J 37/00 126/273 R |
| 4,369,352 | A | * | 1/1983 | Bowles | F24C 14/02 219/395 |
| 5,053,740 | A | * | 10/1991 | Schultz | G01K 7/18 338/22 R |
| 5,360,966 | A | * | 11/1994 | Noda | H05B 6/6411 219/494 |
| 5,993,060 | A | * | 11/1999 | Sakurai | G01K 15/00 374/1 |

(Continued)

FOREIGN PATENT DOCUMENTS

| JP | 05-34208 | 2/1993 |
| JP | 3365013 B2 | 7/1995 |
| JP | 10039044 A | * | 2/1998 |

*Primary Examiner* — Gail Kaplan Verbitsky
(74) *Attorney, Agent, or Firm* — Mori & Ward, LLP

(57) ABSTRACT

A temperature detecting circuit includes a first thermistor, a second thermistor, a first pull-up resistor, a second pull-up resistor, and a controller. The controller is configured to sense a temperature based on a voltage signal from the first thermistor if a temperature corresponding to a voltage signal from one of the first thermistor and the second thermistor is below a threshold temperature. The controller is configured to sense a temperature based on a voltage signal from the second thermistor if a temperature corresponding to a voltage signal from one of the first thermistor and the second thermistor is higher than or equal to the threshold temperature. A resistance Ra of the first thermistor, a resistance Rb of the second thermistor, a resistance Rc of the first pull-up resistor, and a resistance Rd of the second pull-up resistor have a relationship expressed by Ra<Rb and Rc>Rd.

8 Claims, 6 Drawing Sheets

(56) References Cited

U.S. PATENT DOCUMENTS

| | | | |
|---|---|---|---|
| 6,934,645 B2* | 8/2005 | Kim | G01K 3/005 |
| | | | 219/481 |
| 9,228,876 B2* | 1/2016 | Hauzeray | G01F 23/247 |
| 2002/0123690 A1* | 9/2002 | Fraden | G01J 5/04 |
| | | | 600/473 |
| 2006/0267668 A1* | 11/2006 | Porter | G01K 7/015 |
| | | | 327/512 |
| 2007/0029976 A1* | 2/2007 | Garcia | G01K 1/026 |
| | | | 320/150 |
| 2015/0021005 A1* | 1/2015 | Land, III | F24F 11/0012 |
| | | | 165/214 |
| 2016/0076928 A1* | 3/2016 | Hauzeray | G01F 23/247 |
| | | | 73/304 R |

* cited by examiner

TEMPERATURE DETECTING CIRCUIT

CROSS-REFERENCE TO RELATED APPLICATIONS

The present application claims priority under 35 U.S.C. §119 to Japanese Patent Application No. 2012-246454, filed Nov. 8, 2012, entitled "Temperature Detecting Circuit." The contents of this application are incorporated herein by reference in their entirety.

BACKGROUND

1. Field

The present disclosure relates to a temperature detecting circuit.

2. Description of the Related Art

Hydrogen, which is used as a fuel for a fuel cell, is filled into a high pressure gas tank (also simply referred to as tank) for a fuel cell installed in an automobile, in a state in which the hydrogen is compressed to a high pressure of several tens MPa. There are cases in which, when filling the tank with hydrogen as mentioned above, the temperature inside the tank rises abruptly, and when the automobile is running, the hydrogen inside the tank is released from the tank, causing an abrupt drop in temperature. Such temperature rise and temperature drop make it a challenge to keep and control the tank temperature within a range that is determined by a statutory upper limit on the tank temperature, and a lower limit temperature required for maintaining sealability. Accordingly, it is necessary to control the temperature inside the tank to an appropriate temperature. To this end, it is necessary to detect the temperature that fluctuates widely from high to low inside the tank.

A thermistor disclosed in Japanese Unexamined Patent Application Publication No. 5-34208 exists as this type of technique. This thermistor is of a negative temperature coefficient (NTC) type whose resistance decreases with an increase in detected temperature. This thermistor is configured so that two or more thermistor elements that differ in B constant, which indicates the sensitivity of a thermistor with respect to temperature, are connected in parallel to a pair of lead wires. According to this configuration, favorable resistance-temperature characteristics are obtained over a wide temperature range, resulting in wide usage temperature range.

In addition, there is a thermistor with an embedded pull-up resistor disclosed in Japanese Patent No. 3365013. In this type of thermistor, a thermistor and a pull-up resistor are arranged side by side on the same substrate. In this configuration, by making the resistance of the pull-up resistor variable in accordance with detected temperature, it is possible to detect temperature with high accuracy over a wide temperature range.

SUMMARY

According to one aspect of the present invention, a temperature detecting circuit includes a first thermistor, a second thermistor, a first pull-up resistor, a second pull-up resistor, and a controller. The first thermistor has a resistance Ra. The second thermistor has a resistance Rb. The first pull-up resistor is connected between the first thermistor and a power supply. The first pull-up resistor has a resistance Rc. The second pull-up resistor is connected between the second thermistor and the power supply. The second pull-up resistor has a resistance Rd. The controller is configured to sense a temperature based on a voltage signal from the first thermistor if a temperature corresponding to a voltage signal from one of the first thermistor and the second thermistor is below a threshold temperature. The controller is configured to sense a temperature based on a voltage signal from the second thermistor if a temperature corresponding to a voltage signal from one of the first thermistor and the second thermistor is higher than or equal to the threshold temperature. The resistances Ra, Rb, Rc and Rd have a relationship expressed by Ra<Rb and Rc>Rd.

According to another aspect of the present invention, a temperature detecting circuit includes a first thermistor, a second thermistor, a first pull-up resistor, a second pull-up resistor, and a controller. The first thermistor has a resistance Ra. The second thermistor has a resistance Rb. The first pull-up resistor is connected between the first thermistor and a power supply. The first pull-up resistor has a resistance Rc. The second pull-up resistor is connected between the second thermistor and the power supply. The second pull-up resistor has a resistance Rd. The controller is configured to sense a temperature based on a voltage signal from the first thermistor if a temperature corresponding to a voltage signal from one of the first thermistor and the second thermistor is below a threshold temperature. The controller is configured to sense a temperature based on a voltage signal from the second thermistor if a temperature corresponding to a voltage signal from one of the first thermistor and the second thermistor is higher than or equal to the threshold temperature. The resistances Ra, Rb, Rc and Rd have a relationship expressed by Ra<Rb and Rc<Rd.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 6A and 6B are characteristic diagrams, of which FIG. 6A illustrates the accuracies of temperature detection by the thermistors in the temperature detecting circuit according to the first embodiment, and FIG. 6B illustrates the accuracies of temperature detection by the thermistors in the temperature detecting circuit according to the second embodiment.

DESCRIPTION OF THE EMBODIMENTS

Figure 1:
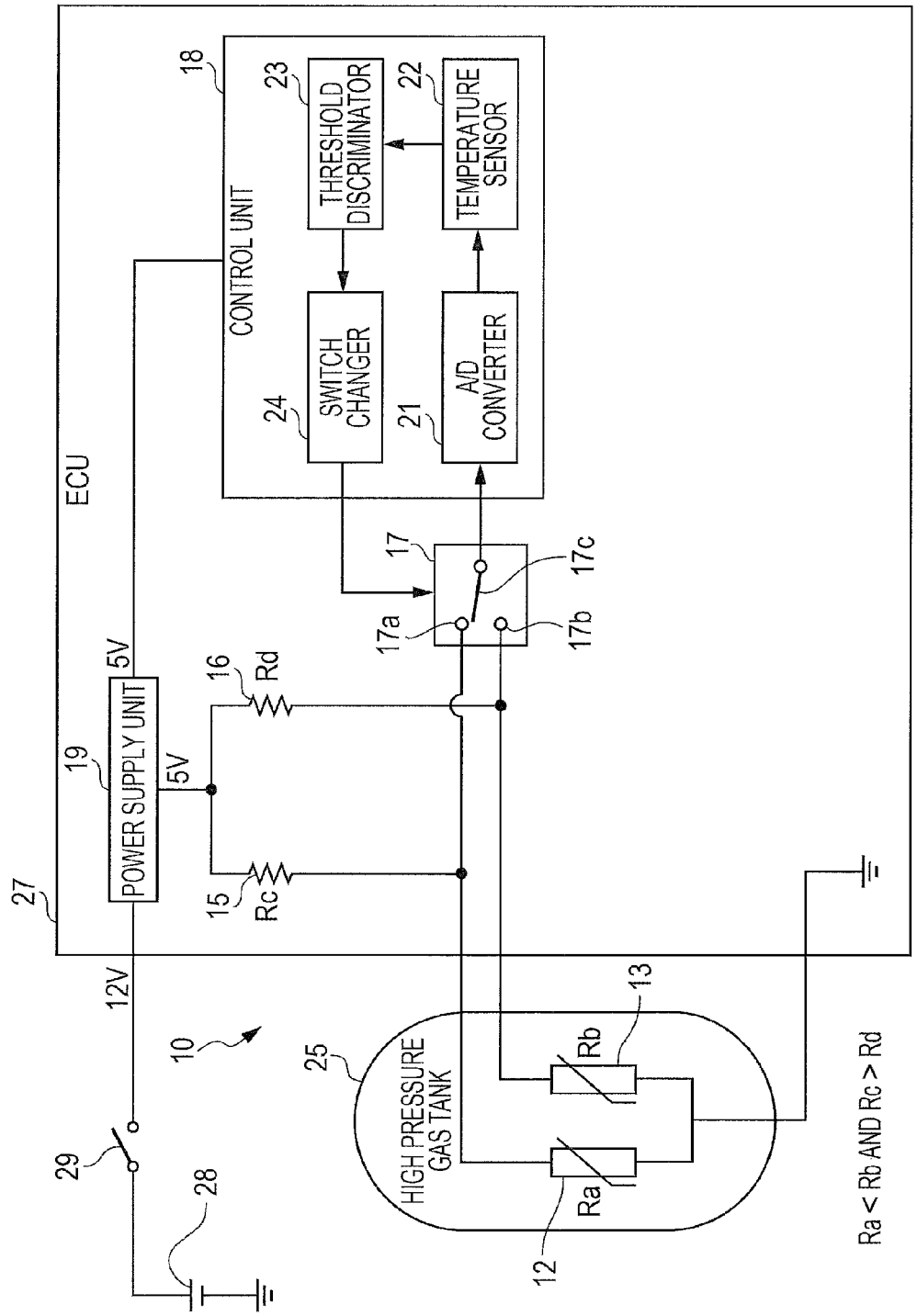
FIG. 1 is a circuit diagram illustrating a configuration of a temperature detecting circuit according to a first embodiment of the present disclosure.

The embodiments will now be described with reference to the accompanying drawings, wherein like reference numerals designate corresponding or identical elements throughout the various drawings.

<Gist of Present Disclosure>

Normally, in cases where NTC thermistors (hereinafter, referred to as thermistors) are used for detecting temperatures that fluctuate widely from the low temperature side to the high temperature side, for example, a temperature detecting circuit is configured so that a pull-up resistor with a large resistance is connected to a thermistor used for detection on the low temperature side, and a pull-up resistor with a small resistance is connected to a thermistor used for detection on the high temperature side.

In this case, the pull-up resistance connected to the thermistor is large on the low temperature side, and the pull-up resistance connected to the thermistor is small on the high temperature side. Therefore, the amount of change in voltage with respect to a change in temperature can be increased in comparison to a typical relationship between a change in temperature and the amount of change in voltage. As a result, the accuracy of temperature detection can be improved. However, in this configuration, the attempt to increase the accuracy of temperature detection on the low temperature side leads to deterioration of the accuracy of temperature detection on the high temperature side, whereas the attempt to increase the accuracy of temperature detection on the high temperature side leads to deterioration of the accuracy of temperature detection on the low temperature side.

For this reason, according to the present disclosure, in order to make the most of the failure sensing capability of two thermistors, a pull-up resistor is connected to each of the thermistors, and the magnitude relationship between the respective resistances of the thermistors and pull-up resistors is set to a specific relationship described later with reference to embodiments described later. This configuration makes it possible to increase the accuracy of temperature detection on the low temperature side and the high temperature side, in addition to ensuring a wide temperature detection range from the low temperature side to the high temperature side. Further, this configuration makes it possible to increase the accuracy of temperature detection on the low temperature side and the high temperature side, in addition to ensuring a wide temperature detection range from the low temperature side to the high temperature side, while performing failure sensing.

Hereinafter, embodiments of the present disclosure will be described with reference to the drawings.

Configuration of First Embodiment

FIG. 1 is a circuit diagram illustrating a configuration of a temperature detecting circuit 10 according to a first embodiment of the present disclosure. The temperature detecting circuit 10 includes a thermistor 12 used for detecting low temperatures which is grounded at one end, a thermistor 13 for detecting high temperatures which is likewise grounded at one end, a pull-up resistor 15 that is connected between the other end of the thermistor 12 used for detecting low temperatures and a power supply unit 19, a pull-up resistor 16 that is connected between the other end of the thermistor 13 used for detecting high temperatures and the power supply unit 19, and a control unit 18. The control unit 18 is configured to acquire a temperature detected by one of the thermistors 12 and 13 by switching a selector switch 17 on the basis of a threshold temperature that is determined in advance.

The thermistor 12 used for detecting low temperatures will be also referred to as low temperature thermistor 12, and the thermistor 13 used for detecting high temperatures will be also referred to as high temperature thermistor 13. The pull-up resistor 15 connected to the low temperature thermistor 12 will be also referred to as low temperature pull-up resistor 15, and the pull-up resistor 16 connected to the high temperature thermistor 13 will be also referred to as high temperature pull-up resistor 16.

The control unit 18 includes an A/D converter 21, a temperature sensor 22, a threshold discriminator 23, and a switch changer (selector) 24. The control unit 18 includes, for example, a central processing unit (CPU), and a memory such as a read only memory (ROM) or a random access memory (RAM).

Figure 2:
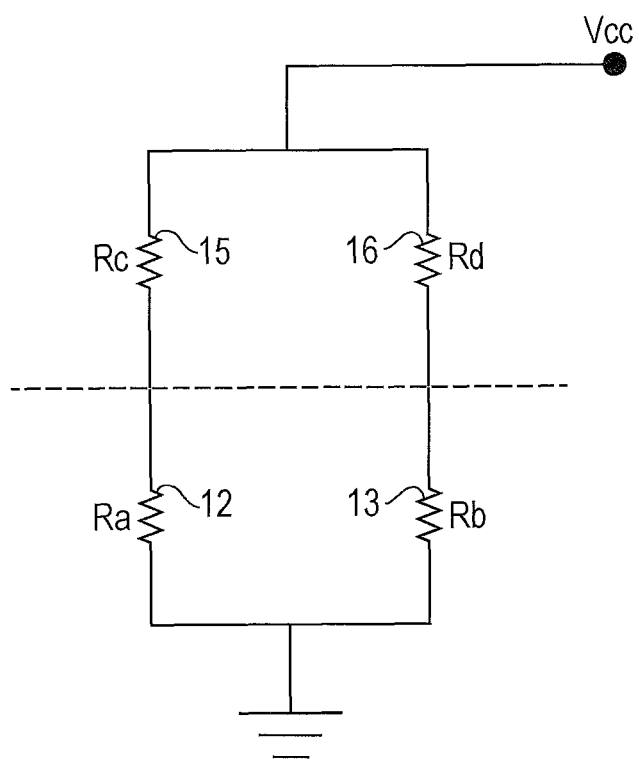
FIG. 2 is a circuit diagram illustrating a configuration of the temperature detecting circuit according to the present disclosure.

In the case of a configuration in which, as illustrated in FIG. 2, the thermistors 12 and 13 and the pull-up resistors 15 and 16 are connected between a voltage output terminal Vcc of the power supply unit 19 and the ground, when Ra denotes the resistance of the low temperature thermistor 12, Rb denotes the resistance of the high temperature thermistor 13, Rc denotes the resistance of the low temperature pull-up resistor 15, and Rd denotes the resistance of the high temperature pull-up resistor 16, the magnitude relationship between the resistances Ra to Rd at a given reference temperature (for example, 0° C.) is set so that Ra<Rb and Rc>Rd.

In the first embodiment, the temperature detecting circuit 10 configured as descried above is used for the purpose of detecting the temperature inside a high pressure gas tank (also referred to as tank) 25 used for a fuel cell installed in an automobile. That is, in the first embodiment, as illustrated in FIG. 1, the thermistors 12 and 13 are disposed inside the tank 25 used for an automobile, and the pull-up resistors 15 and 16 are disposed in an electronic control unit (ECU) 27 located outside the tank 25 of the automobile.

The ECU 27 is installed with the power supply unit 19, the control unit 18, and the selector switch 17. The voltage input side of the power supply unit 19 is connected to the positive pole side of an on-board battery (also referred to as battery) 28 via an ignition switch (IGSW) 29, and the voltage output side is connected to each of the pull-up resistors 15 and 16, and the voltage input terminal of the control unit 18. When the IGSW 29 is turned on, the power supply unit 19 steps down (for example, to 5 V) the output voltage of the battery 28 (for example, 12 V), and supplies the resulting voltage to each of the pull-up resistors 15 and 16 and the control unit 18.

The selector switch 17 includes first and second fixed terminals 17a and 17b, and a single movable terminal 17c. The first fixed terminal 17a is connected between the low temperature thermistor 12 and the low temperature pull-up resistor 15, and the second fixed terminal 17b is connected between the high temperature thermistor 13 and the high temperature pull-up resistor 16. The base end of the movable terminal 17c is connected to the A/D converter 21, and the distal end is connected to the first or second fixed terminal 17a or 17b in accordance with switch changing control described later.

The A/D converter 21 converts an analog temperature detection signal from one of the thermistors 12 and 13, which is inputted to the A/D converter 21 when the movable terminal 17c of the selector switch 17 is switched so as to connect to one of the first and second fixed terminals 17a and 17b, into a digital signal. The temperature sensor 22 converts a temperature indicated by the digital signal into a physical quantity indicative of this temperature, and senses the temperature.

A predetermined threshold temperature th1 is set for the threshold discriminator 23. The threshold discriminator 23 determines whether a temperature sensed by the temperature sensor 22 is below, or higher than equal to, the threshold temperature th1. The switch changer 24 executes the following switch changing control. That is, the switch changer 24 switches the movable terminal 17c of the selector switch 17 to the side of the first fixed terminal 17a when the sensed temperature is determined to be below the threshold temperature th1 by the threshold discriminator 21, and the switch changer 24 switches the movable terminal 17c to the side of the second fixed terminal 17b when the sensed temperature is determined to be higher than or equal to the threshold temperature th1.

The temperature inside the tank 25 sensed by the temperature sensor 22 is used as one of control parameters during communication/filling operation in which the tank 25 is filled with hydrogen while communicating with a hydrogen station (not illustrated). Control parameters include information such as the volume, internal pressure, and the above-mentioned internal temperature of the tank 25, and the filling speed of hydrogen to the tank 25.

Operation of First Embodiment

Figure 3:
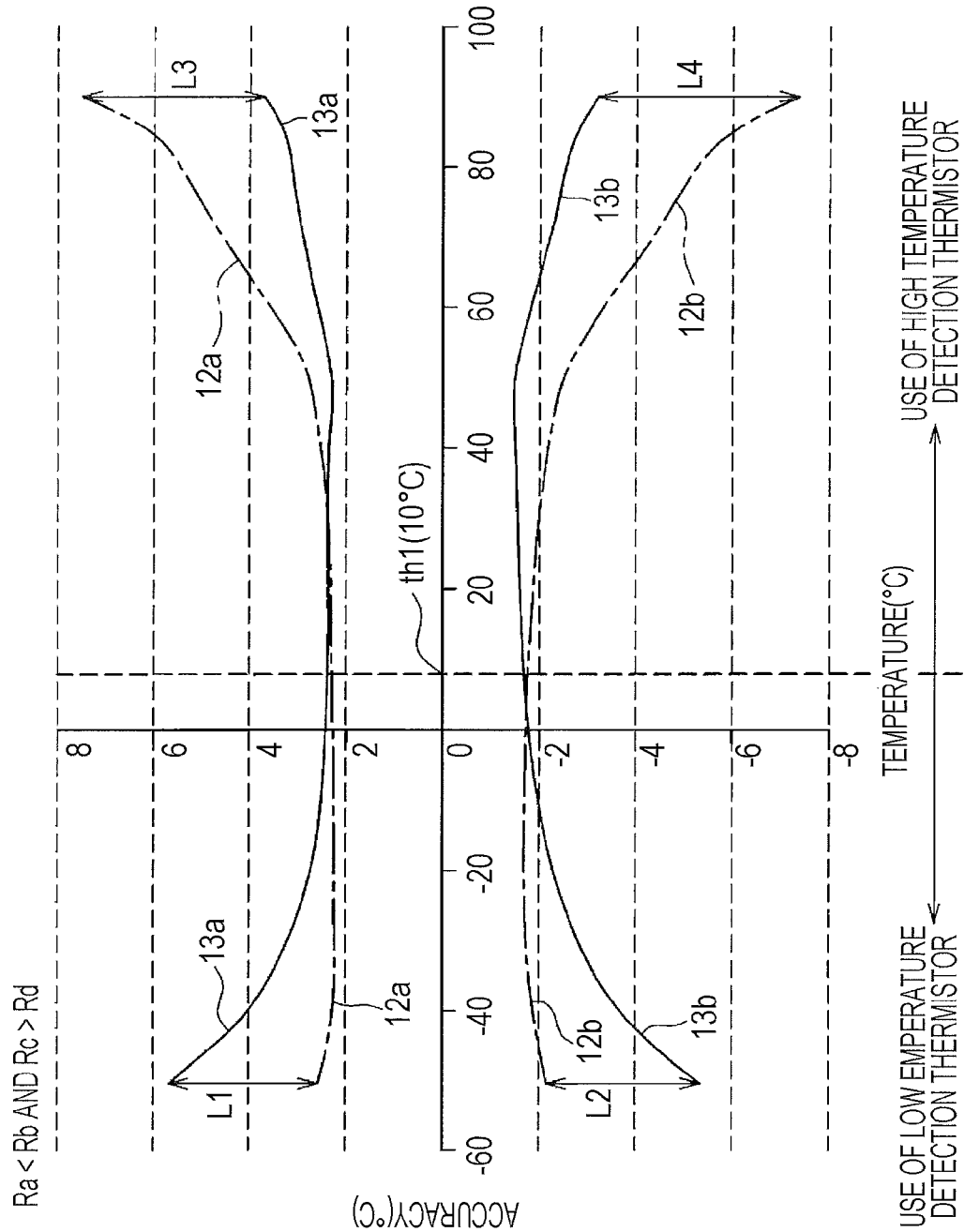
FIG. 3 is a characteristic diagram illustrating the respective detection accuracies of thermistors at various temperatures in the temperature detecting circuit according to the first embodiment.
Figure 4:
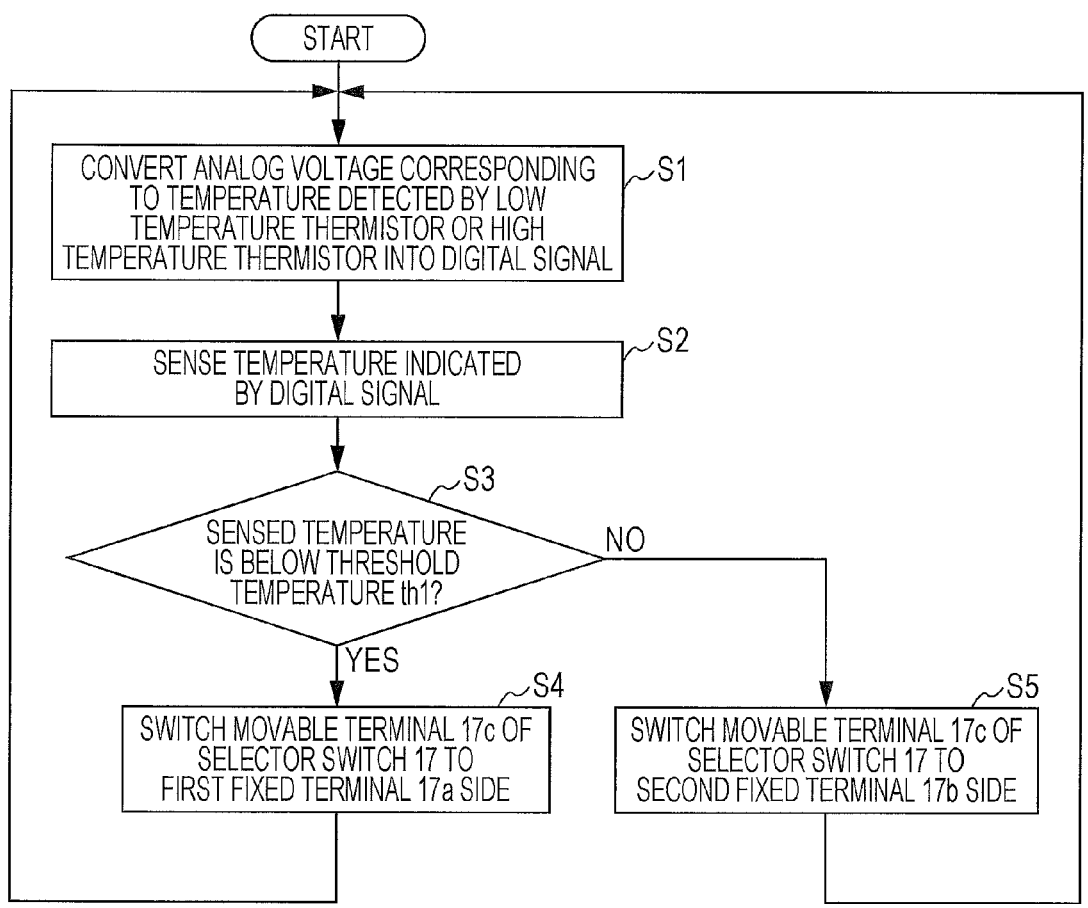
FIG. 4 is a flowchart for explaining how the temperature inside a high pressure gas tank is detected by the temperature detecting circuit according to the first embodiment.

Next, how the temperature detecting circuit 10 according to the first embodiment detects temperature inside the tank 25 will be described with reference to FIGS. 3 and 4. First, FIG. 3 is a characteristic diagram illustrating the relationship between temperature (° C.) detected by each of the thermistors 12 and 13, and the accuracy (° C.) of temperature detection when the temperature inside the tank 25 fluctuates over a range of, for example, −50° C. to 90° C., in a case in which the respective resistances Ra to Rd of the thermistors 12 and 13 and pull-up resistors 15 and 16 have a magnitude relationship expressed by Ra<Rb and Rc>Rd. The detection accuracy (° C.) is expressed in other words as the detection error of each of the thermistors 12 and 13. In addition, the characteristic diagram of FIG. 3 illustrates maximum error values calculated by using the specifications of the thermistors. These values may be derived from actual measurement.

As illustrated in FIG. 3, as indicated by an alternate long and short dash line 12a on the positive side of accuracy (° C.) and an alternate long and short dash line 12b on the negative side, graphs indicative of the relationship between the detected temperature and detection accuracy (also simply referred to as accuracy) by the low temperature thermistor 12 have substantially line symmetry about the level 0 of accuracy (° C.). As for graphs indicative of the relationship between the detected temperature and detection accuracy by the high temperature thermistor 13, as indicated by an alternate long and short dash line 13a on the positive side of accuracy (° C.) and an alternate long and short dash line 13b on the negative side, the graphs have substantially line symmetry about the level 0 of accuracy (° C.).

This means that, for example, when the temperature detected by the low temperature thermistor 12 is −27° C. in a case in which the temperature of the tank 25 is −30° C., the accuracy (° C.) at this time is −27−(−30)=+3° C. When the temperature detected by the low temperature thermistor 12 is 73° C. in a case in which the temperature of the tank 25 is 70° C., the accuracy (° C.) at this time is 73−70=+3° C. When the accuracy indicative of how much the low temperature thermistor 12 detects a temperature to be more positive than the actual temperature is represented by a graph, the resulting graph is as indicated by the alternate long and short dash line 12a, for example.

When the temperature detected by the low temperature thermistor 12 is −33° C. in a case in which the temperature of the tank 25 is −30° C., the accuracy (° C.) at this time is −33−(−30)=−3° C. When the temperature detected by the low temperature thermistor 12 is 67° C. in a case in which the temperature of the tank 25 is 70° C., the accuracy (° C.) at this time is 67−70=−3° C. When the accuracy indicative of how much the low temperature thermistor 12 detects a temperature to be more negative than the actual temperature is represented by a graph, the resulting graph is as indicated by the alternate long and short dash line 12b, for example. These detection accuracies are determined in the same manner for the high temperature thermistor 13 as well.

It is assumed that the threshold temperature th1 that is set in advance for the threshold discriminator 23 is, for example, 10° C. as indicated by a vertical broken line in FIG. 3. That is, the threshold temperature th1 is set as follows by using the accuracy checked in advance, which indicates the difference between the temperature detected by each of the thermistors 12 and 13 and the actual temperature. The accuracy of the low temperature thermistor 12 and the accuracy of the high temperature thermistor 13 are compared with each other for various temperature values, and the threshold temperature th1 is set to a temperature within a temperature range (0° C. to 30° C.) that is determined from temperature values over which the accuracy of the low temperature thermistor 12 is higher than the accuracy of the high temperature thermistor 13 (which are, for example, −60° C. to 15° C. according to the comparison between the accuracies 12a and 13a, and −60° C. to 0° C. according to the comparison between the accuracies 12b and 13b), and temperature values over which the accuracy of the high temperature thermistor 13 is higher than the accuracy of the low temperature thermistor 12 (which are, for example, 30° C. to 90° C. according to the comparison between the accuracies 12a and 13a, and 5° C. to 90° C. according to the comparison between the accuracies 12b and 13b). In addition, the threshold temperature th1 is set to a temperature (10° C. in the case of FIG. 3) at the intermediate position (mean position) between the position where the respective accuracies 12a and 13a represented as graphs on the positive side of the low temperature thermistor 12 and high temperature thermistor 13 intersect, and the position where the accuracies 12b and 13b represented by graphs on the negative side intersect. In other words, the threshold temperature th1 is set to the temperature at the position representing the mean accuracy value of the best value of the accuracies 12a and 12b of the low temperature thermistor 12, and the best value of the accuracies 13a and 13b of the high temperature thermistor 13.

Next, how the temperature inside the tank 25 is detected by each of the thermistors 12 and 13 of the temperature detecting circuit 10 under these conditions will be described with reference to the flowchart of FIG. 4. It is assumed that, as the initial conditions, the temperature inside the tank 25 illustrated in FIG. 1 is, for example, below 10° C., and in this case, the movable terminal 17c of the selector switch 17 has switched to the first fixed terminal 17a.

In step S1, an analog voltage based on the temperature detected by the low temperature thermistor 12 is outputted to the A/D converter 21, where the analog voltage is converted into a digital signal. Next, in step S2, the temperature indicated by the digital signal is sensed by the temperature sensor 22. In step S3, it is determined by the threshold discriminator 23 whether the sensed temperature is below the threshold temperature th1 of 10° C. or not (i.e. higher than or equal to the threshold temperature th1). If it is determined as a result of this determination that the sensed temperature is below 10° C. (Yes), in step S4, the movable terminal 17c of the selector switch 17 is switched to the first fixed terminal 17a side by the switch changer 24. In this case, since the movable terminal 17c has already been switched to the first fixed terminal 17a side, the state is maintained as it is.

Thereafter, the processes in steps S1 to S3 mentioned above are continued. In a case where it is determined by the determination in step S3 that the sensed temperature is below 10° C., in step S4, the movable terminal 17c is maintained in a state in which the movable terminal 17c is switched to the first fixed terminal 17a side, and the operations in step S1 to S3 are repeated again.

Such temperature detection control on the low temperature side provides the following advantage. As illustrated in FIG. 3, at temperatures below 10° C., the temperature detection accuracies 12a and 12b of the low temperature thermistor 12 are better than the temperature detection accuracies 13a and 13b of the high temperature thermistor 13, as indicated by their differences L1 and L2, respectively. That is, at temperatures below 10° C., the temperature inside the tank 25 is detected by the low temperature thermistor 12 whose temperature detection accuracies 12a and 12b are better (higher) than those of the high temperature thermistor 13. It should be noted that L1 and L2 each denote the maximum difference in detection accuracy in the case of the minimum temperature of −50° C.

Supposing that, thereafter, the temperate sensed by the temperature sensor 22 in step S2 becomes 15° C., it is determined in the determination in step S3 that the sensed temperature is not below 10° C., that is, higher than or equal to 10° C. (No). In this case, in step S5, the movable terminal 17c of the selector switch 17 is switched to the second fixed terminal 17b side under switching control by the switch changer 24.

Consequently, the processing returns to step S1, where an analog voltage based on the temperature detected by the high temperature thermistor 13 is outputted to the A/D converter 21, and the analog voltage is converted into a digital signal. Further, in step S2, the temperature indicated by the digital signal is sensed by the temperature sensor 22, and in step S3, it is determined by the threshold discriminator 23 whether the sensed temperature is below the threshold temperature th1 of 10° C. or not.

In a case where it is determined as a result of this determination that the sensed temperature is not below 10° C. (No), in step S5, the movable terminal 17c is maintained in a state in which the movable terminal 17c is switched to the second fixed terminal 17b side, and the processes in S1 to S3 mentioned above are continued.

Such temperature detection control on the high temperature side provides the following advantage. As illustrated in FIG. 3, at temperatures higher than or equal to 10° C., the temperature detection accuracies 13a and 13b of the high temperature thermistor 13 are better than the temperature detection accuracies 12a and 12b of the low temperature thermistor 12, as indicated by their differences L3 and L4, respectively. That is, at temperatures higher than or equal to 10° C., the temperature inside the tank 25 is detected by the high temperature thermistor 13 whose temperature detection accuracies 13a and 13b are better (higher) than those of the low temperature thermistor 12. It is to be noted that L3 and L4 each denote the maximum difference in detection accuracy in the case of the maximum temperature of 90° C. Incidentally, other than being caused by outside air temperature, a rise in the temperature inside the tank 25 occurs in cases such as when the driver of a fuel cell electric vehicle depresses the accelerator pedal deeply to rapidly increase the amount of electric power extracted from the fuel cell.

Effects of First Embodiment

As described above, the temperature detecting circuit 10 according to the first embodiment includes the low temperature thermistor 12 that has the resistance Ra, the high temperature thermistor 13 that has the resistance Rb, the low temperature pull-up resistor 15 that is connected between the low temperature thermistor 12 and the power supply unit 19, and has the resistance Rc, the high temperature pull-up resistor 16 that is connected between the high temperature thermistor 13 and the power supply unit 19, and has the resistance Rd, and the control unit 18. The control unit 18 is configured to sense temperature by selecting a voltage signal on the low temperature thermistor 12 side by the selector switch 17 in a case in which a temperature corresponding to a voltage signal based on a temperature detected by one of the low temperature thermistor 12 and the high temperature thermistor 13 is below the threshold temperature th1 that is determined in advance, and sense temperature by selecting a voltage signal on the high temperature thermistor 13 side by the selector switch 17 in a case in which the above-mentioned temperature is higher than or equal to the threshold temperature th1. The resistances Ra, Rb, Rc, and Rd have a magnitude relationship expressed by Ra<Rb and Rc>Rd. The selector switch 17 and the control unit 18 constitute the controller of the present disclosure.

According to this configuration, the respective resistances Ra, Rb, Rc, and Rd of the low temperature thermistor 12, high temperature thermistor 13, low temperature pull-up resistor 15, and high temperature pull-up resistor 16 have a magnitude relationship expressed by Ra<Rb and Rc>Rd. Consequently, on the low temperature side blow the threshold temperature th1, the temperature detection accuracy on the low temperature thermistor 12 side is better than the temperature detection accuracy of the high temperature thermistor 13. Conversely, on the high temperature side higher than or equal to the threshold temperature th1, the temperature detection accuracy on the high temperature thermistor 13 side is better than the temperature detection accuracy of the low temperature thermistor 12.

Accordingly, the control unit 18 executes the following control. That is, in a case in which the temperature corresponding to a voltage signal selected by the selector switch 17 is below the threshold temperature th1, temperature is sensed by selecting a voltage signal from the low temperature thermistor 12 by the selector switch 17, and in a case in which the above-mentioned temperature is higher than or equal to the threshold temperature th1, temperature is sensed by selecting a voltage signal from the high temperature thermistor 13 by the selector switch 17.

According to this control, on the low temperature side below the threshold temperature th1, a voltage signal corresponding to a temperature detected by the low temperature thermistor 12 having a better detection accuracy than the high temperature thermistor 13 is acquired. A temperature on the low temperature side can be obtained with good accuracy from this voltage signal. Conversely, on the high temperature side higher than or equal to the threshold temperature th1, a voltage signal corresponding to a temperature detected by the high temperature thermistor 13 having a better detection accuracy than the low temperature thermistor 12 is acquired. A temperature on the high temperature side can be obtained with good accuracy from this voltage signal.

Therefore, even in a case in which the temperature at the target location fluctuates widely from the low temperature of −50° C. to the high temperature of 90° C., the temperature can be detected with high accuracy. Because temperature is actually detected by only two elements, that is, two thermistors that are typically small in size, temperature detection can be achieved by means of a compact structure. Therefore, even if the target location is a narrow space such as the space inside an enclosed container, it is only necessary to dispose two thermistors inside the space. Consequently, problems such as difficulty of installation due to an increase in the overall size of the valve unit, and unnecessary restriction on spatial volume may be eliminated.

In addition, as illustrated in FIG. 3, the threshold temperature th1 is set to a temperature detected with a detection accuracy that is the mean of the best value of temperature detection accuracy of the low temperature thermistor 12 within a predetermined temperature range, and the best value of temperature detection accuracy of the high temperature thermistor 13 within the temperature range. That is, the threshold temperature th1 is set to a temperature detected with a detection accuracy that is the mean of the best values of temperature detection accuracy of both the low temperature thermistor 12 and the high temperature thermistor 13.

Therefore, on the low temperature side below the threshold temperature th1, temperature detected by the low temperature thermistor 12 whose temperature detection accuracy on the low temperature side is better than that of the high temperature thermistor 13 can be used. Conversely, on the high temperature side higher than or equal to the threshold temperature th1, temperature detected by the high temperature thermistor 13 whose temperature detection accuracy on the high temperature side is better than that of the low temperature thermistor 12 can be used. Consequently, even in a case in which temperature fluctuates widely from low to high temperatures, temperature can be detected with high accuracy by selectively using either one of the low temperature thermistor 12 and the high temperature thermistor 13 depending on the threshold temperature th1.

The low temperature thermistor 12 and the high temperature thermistor 13 are placed inside the tank 25 whose internal temperature fluctuates over a wide range as a fluid is filled into or released from the tank 25. According to this configuration, temperature is actually detected by only two elements, that is, two thermistors that are typically small in size. Therefore, it is only necessary to dispose the two thermistors inside the tank 25, which means that even if the tank 25 has a narrow internal space, installation is easy, and problems such as unnecessary restriction on spatial volume may be eliminated.

Second Embodiment

Figure 5:
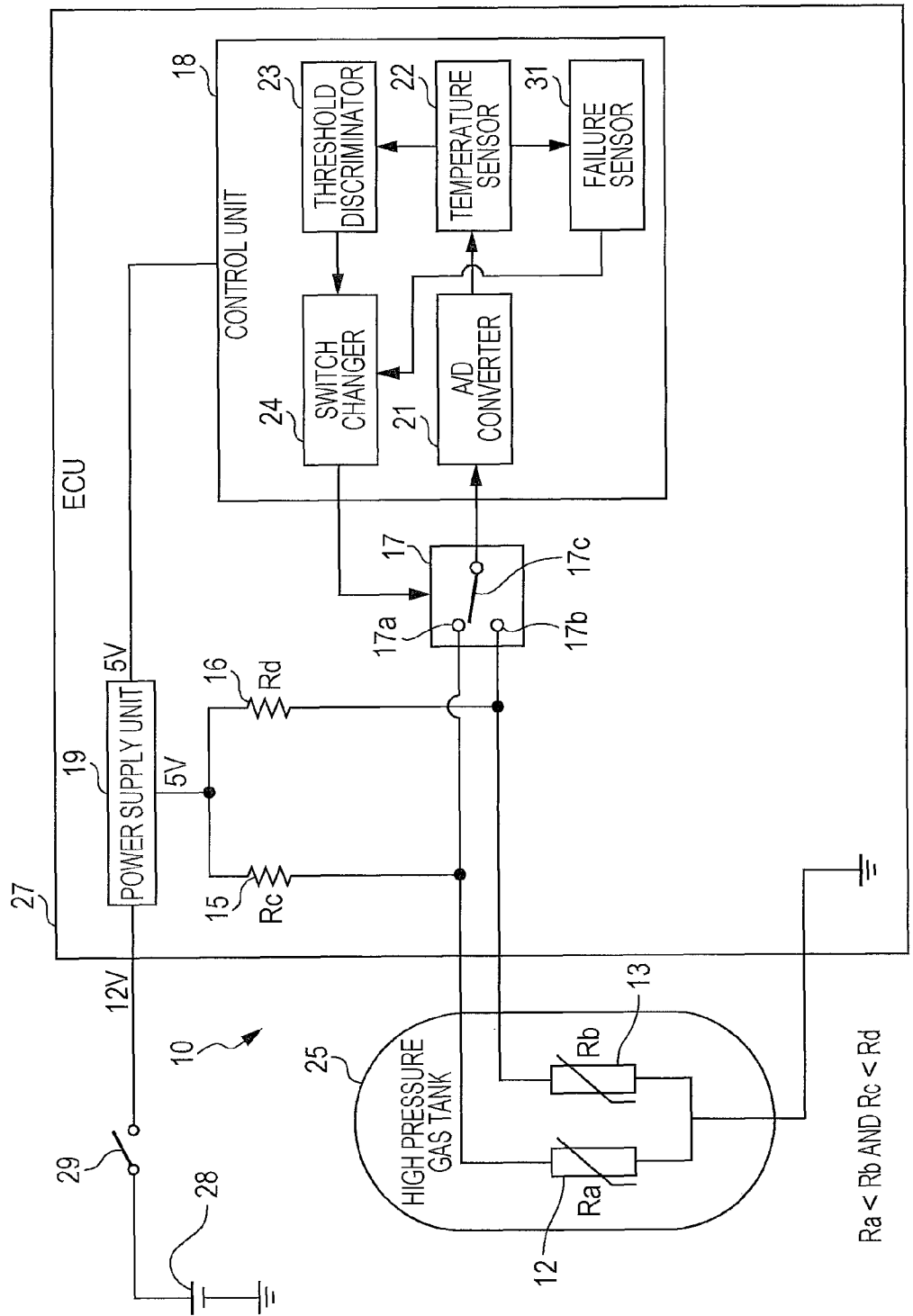
FIG. 5 is a circuit diagram illustrating a configuration of a temperature detecting circuit according to a second embodiment of the present disclosure.

FIG. 5 is a circuit diagram illustrating a configuration of a temperature detecting circuit 30 according to a second embodiment of the present disclosure. The temperature detecting circuit 30 according to the second embodiment differs from the temperature detecting circuit 10 according to the first embodiment in that, as illustrated in FIG. 5, the respective resistances Ra to Rd of the thermistors 12 and 13 and pull-up resistors 15 and 16 have a magnitude relationship expressed by Ra<Rb and Rc<Rd, and that the control unit 18 further includes a failure sensor 31. The respective resistances Ra and Rb of the thermistors 12 and 13 will be also referred to as thermistor resistances Ra and Rb, and the respective resistances Rc and Rd of the pull-up resistors 15 and 16 will be also referred to as pull-up resistances Rc and Rd.

Hereinafter, only differences of the temperature detecting circuit 30 according to the second embodiment from the temperature detecting circuit 10 according to the first embodiment will be described.

First, the accuracies of temperature detection by the thermistors 12 and 13 in a case in which the resistances Ra to Rd have a magnitude relationship expressed by Ra<Rb and Rc<Rd will be described with reference to FIGS. 6A and 6B.

Figure 6A:
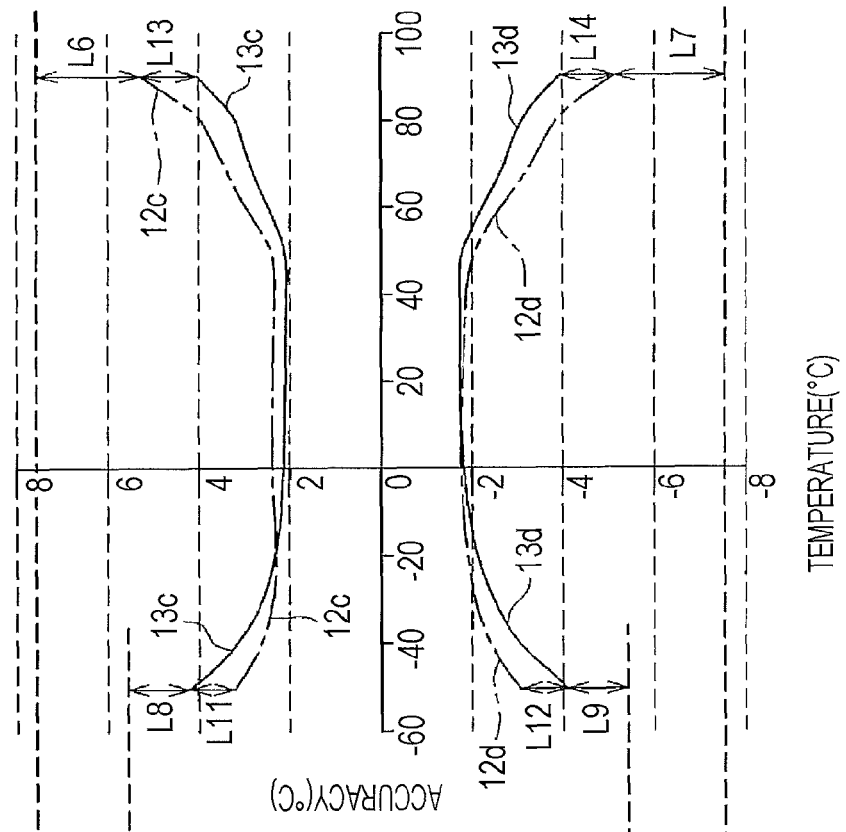

FIG. 6A is a characteristic diagram illustrating the detection accuracies (° C.) at various temperatures (° C.) of the thermistors 12 and 13, in a case in which the resistances Ra to Rd have a magnitude relationship expressed by Ra<Rb and Rc>Rd as described above with reference to the first embodiment. FIG. 6B is a characteristic diagram illustrating the detection accuracies (° C.) at various temperatures (° C.) of the thermistors 12 and 13, in a case in which the resistances Ra to Rd have a magnitude relationship expressed by Ra<Rb and Rc<Rd according to the second embodiment. The characteristic diagrams of FIGS. 6A and 6B illustrate maximum error values calculated by using the specifications of the thermistors.

Figure 6B:
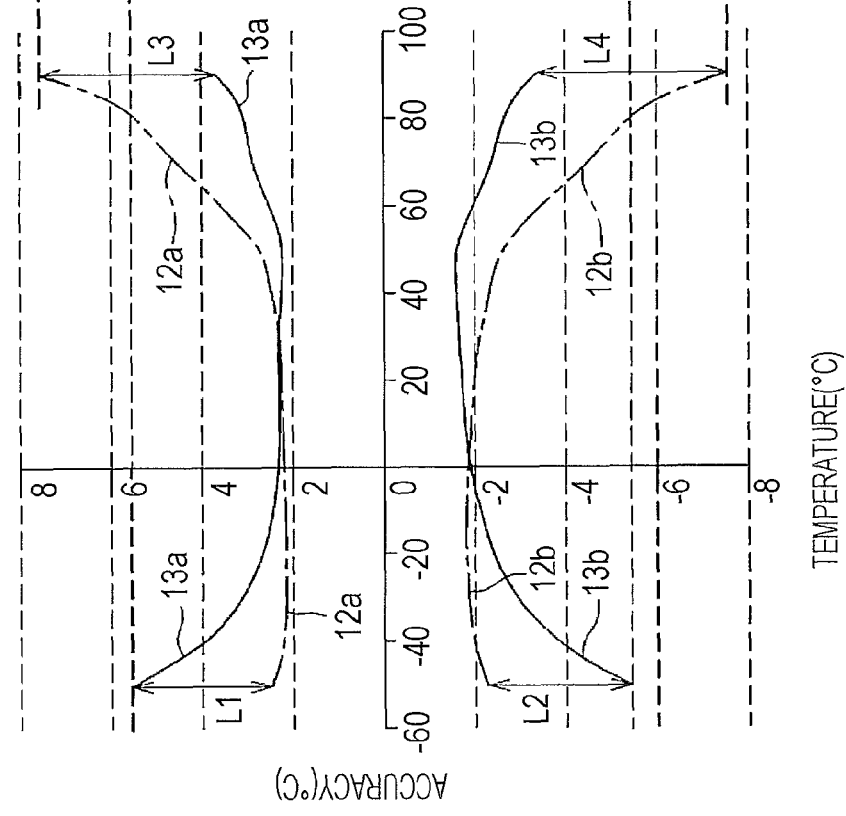

In the case of the temperature detecting circuit 30 according to the second embodiment, as illustrated in FIG. 6B, as indicated by an alternate long and short dash line 12c on the positive side of accuracy (° C.) and an alternate long and short dash line 12d on the negative side, graphs indicative of the relationship between the detected temperature and detection accuracy by the low temperature thermistor 12 have substantially line symmetry about the level 0 of accuracy (° C.). As for graphs indicative of the relationship between the detected temperature and detection accuracy by the high temperature thermistor 13, as indicated by an alternate long and short dash line 13c on the positive side of accuracy (° C.) and an alternate long and short dash line 13d on the negative side, the graphs have substantially line symmetry about the level 0 of accuracy (° C.).

The respective detection accuracies 12c, 12d, 13c, and 13d at various temperatures of the thermistors 12 and 13 according to the second embodiment are compared with the respective detection accuracies 12a, 12b, 13a, and 13b at various temperatures of the thermistors 12 and 13 according to the first embodiment illustrated in FIG. 6A.

As opposed to the case where Rc>Rd as in the first embodiment, by making the pull-up resistances Rc and Rd have the relationship Rc<Rd as in the second embodiment, the detection accuracy 12c of the low temperature thermistor 12 improves by an accuracy level indicated by L6 on the position side along the vertical axis in FIG. 6B, and the detection accuracy 12d improves by an accuracy level indicated by L7 on the negative side along the vertical axis. In addition, the detection accuracy 13c of the high temperature thermistor 13 improves by an accuracy level indicated by L8 on the position side along the vertical axis in FIG. 6B, and the detection accuracy 13d improves by an accuracy level indicated by L9 on the negative side along the vertical axis.

Further, as compared with the differences L1, L2, L3, and L4 in detection accuracy according to the first embodiment illustrated in FIG. 6A, the corresponding differences in detection accuracy are smaller in the second embodiment as indicated by L11, L12, L13, and L14, respectively, in FIG. 6B.

That is, as illustrated in FIGS. 6A and 6B, on the positive side along the vertical axis, as compared with the maximum difference L1 at the minimum temperature of −50° C. between the detection accuracy 12a of the low temperature thermistor 12 and the detection accuracy 13a of the high temperature thermistor 13 according to the first embodiment, the maximum difference L11 at the minimum temperature of −50° C. between the detection accuracy 12c of the low temperature thermistor 12 and the detection accuracy 13c of the high temperature thermistor 13 according to the second embodiment becomes small. In addition, on the negative side along the vertical axis, as compared with the maximum difference L2 at the minimum temperature of −50° C. between the detection accuracies 12b and 13b according to the first embodiment, the maximum difference L12 at the minimum temperature of −50° C. between the detection accuracies 12d and 13d according to the second embodiment becomes small.

Likewise, on the positive side along the vertical axis, as compared with the maximum difference L3 at the maximum temperature of 90° C. between the detection accuracy 12a of the low temperature thermistor 12 and the detection accuracy 13a of the high temperature thermistor 13 according to the first embodiment, the maximum difference L13 at the maximum temperature of 90° C. between the detection accuracy 12c of the low temperature thermistor 12 and the detection accuracy 13c of the high temperature thermistor 13 according to the second embodiment becomes small. In addition, on the negative side along the vertical axis, as compared with the maximum difference L4 at the maximum temperature of 90° C. between the detection accuracies 12b and 13b according to the first embodiment, the maximum difference L14 at the maximum temperature of 90° C. between the detection accuracies 12d and 13d according to the second embodiment becomes small.

The temperature inside the tank 25 is detected by switching between the low temperature thermistor 12 having the temperature detection accuracies 12c and 12d, and the high temperature thermistor 13 having the temperature detection accuracies 13c and 13d as mentioned above, on the basis of the threshold temperature th1 in the same manner as described above with reference to the first embodiment. Next, the failure sensor 31 illustrated in FIG. 5 senses an offset failure and a gain failure of each of the thermistors 12 and 13. An offset failure refers to a failure in a case in which the absolute value of the difference between the temperatures detected by the thermistors 12 and 13 exceeds a reference temperature over a wide temperature range of, for example, −50° C. to 90° C. A gain failure refers to a failure in a case in which the difference between the temperatures detected by the thermistors 12 and 13 exceeds a reference temperature over a specific temperature range of, for example, 20° C. to 23° C.

A reference temperature is the largest of values obtained by combining and summing the absolute values of error (accuracy) of the thermistors 12 and 13. For example, suppose that at a given temperature, the low temperature thermistor 12 has errors of +3° C. and −2° C., and the high temperature thermistor 13 has errors of +3° C. and −4° C. In this case, combinations such as +3° C.+|−4° C.|=7° C., and |−2° C.|+2° C.=4° C. exist. Thus, the largest value, 7° C., of these temperature values serves as the reference temperature. This reference temperature is obtained by calculation or actual measurement at predetermined temperature intervals (for example, at intervals of 5° C.) in the temperature range of −50° C. to 90° C. illustrated in FIG. 6B. The reference temperature is held in a memory (not illustrated) of the failure sensor 31 in advance.

The failure sensor 31 outputs a switch change command to the switch changer 24 every time the temperature sensed by the temperature sensor 22 becomes a temperature (referred to as sensing temperature) at each predetermined temperature interval (for example, at each 5° C. interval). In accordance with this command, the switch changer 24 controls the movable terminal 17c of the selector switch 17 so as to switch from the current connection position to the other connection position only for a predetermined period of time, and then return to the original position. For example, in a case in which the movable terminal 17c is currently connected to the first fixed terminal 17a, the switch changing control causes the movable terminal 17c to switch to the second fixed terminal 17b side only for one second, for example, and then return to the first fixed terminal 17a side.

In this case, while the temperature sensor 22 initially senses the temperature detected by the low temperature thermistor 12, when switching the movable terminal 17c to the second fixed terminal 17b side only for a predetermined period of time, the temperature sensor 22 senses the temperature detected by the high temperature thermistor 13, and outputs the temperature to the failure sensor 31. Therefore, the failure sensor 31 acquires temperatures detected by both the low temperature thermistor 12 and the high temperature thermistor 13, every time a sensing temperature at each predetermined temperature interval is reached. After acquiring these temperatures, the failure sensor 31 calculates the absolute value of the difference between the two temperatures, and in a case in which this temperature difference exceeds the reference temperature, the failure sensor 31 holds this temperature difference exceeding the reference temperature (excess temperature difference) in association with the sensing temperature. Further, the failure sensor 31 executes the operation of holding the excess temperature difference at predetermined temperature intervals in the temperature range of −50° C. to 90° C., and in a case in which the excess temperature difference exists at every predetermined temperature interval over a wide temperature range of, for example, −30° C. to 70° C., the failure sensor 31 determines that an offset failure has occurred in the thermistors 12 and 13. In a case where the excess temperature difference exists at every predetermined temperature interval over a specific temperature range of, for example, 20° C. to 23° C. that is determined in advance, the failure sensor 31 determines that a gain failure has occurred in the thermistors 12 and 13.

Through the configuration and the operation mentioned above, a failure of the thermistors 12 and 13 can be determined with good accuracy. Of course, the switch change mentioned above may not be performed. Instead, current may be supplied to both of the thermistors 12 and 13 at all times, and the control unit may keep track of the respective states of the thermistors 12 and 13 by using a threshold, and use the obtained information for the purpose of determining a failure.

Effects of Second Embodiment

As described above, the temperature detecting circuit 30 according to the second embodiment includes the low temperature thermistor 12 that has the resistance Ra, the high temperature thermistor 13 that has the resistance Rb, the low temperature pull-up resistor 15 that is connected between the low temperature thermistor 12 and the power supply unit 19, and has the resistance Rc, the high temperature pull-up resistor 16 that is connected between the high temperature thermistor 13 and the power supply unit 19, and has the resistance Rd, and the control unit 18. The control unit 18 is configured to sense temperature by selecting a voltage signal on the low temperature thermistor 12 side by the selector switch 17 in a case in which a temperature corresponding to a voltage signal based on a temperature detected by one of the low temperature thermistor 12 and the high temperature thermistor 13 is below the threshold temperature th1 that is determined in advance, and sense temperature by selecting a voltage signal on the high temperature thermistor 13 side by the selector switch 17 in a case in which the above-mentioned temperature is higher than or equal to the threshold temperature th1. The resistances Ra, Rb, Rc, and Rd have a magnitude relationship expressed by Ra<Rb and Rc<Rd. The selector switch 17 and the control unit 18 constitute the controller of the present disclosure.

According to this configuration, even in a case in which the internal temperature of the tank 25 fluctuates widely from low to high temperatures as in the first embodiment mentioned above, the temperature can be detected with high accuracy. Moreover, temperature detection can be achieved by means of a compact structure including the two thermistors 12 and 13 which are typically small in size. Therefore, even if the target location is a narrow space such as the space inside the tank 25, problems such as difficulty of installation and unnecessary restriction on spatial volume may be eliminated.

The control unit 18 stores a reference temperature that is determined in advance at predetermined temperature intervals, in association with each of the predetermined temperature intervals, and every time a temperature sensed from a voltage signal from one of the thermistors 12 and 13 becomes a temperature at each of the predetermined temperature intervals, the control unit 18 determines the difference between temperatures (temperature difference) detected from voltage signals from both the thermistors 12 and 13, and compares the temperature difference with the stored temperature difference. In a case where, as a result of this comparison, a difference that exceeds the reference temperature is obtained over a temperature range wider than a predetermined temperature range, the control unit 18 determines that an offset failure has occurred, and in a case in which such a difference is obtained over a specific temperature range narrower than a predetermined temperature range, the control unit 18 determines that a gain failure has occurred.

According to this configuration, an offset failure or a gain failure of each of the thermistors 12 and 13 can be determined appropriately.

The reference temperature is the largest of values obtained by combining and summing the absolute values of temperature detection accuracy of the thermistors 12 and 13. That is, for each predetermined temperature interval, the lowest of the temperature detection accuracies of the thermistors 12 and 13 is set as the reference temperature. Therefore, if the difference between temperatures detected by the thermistors 12 and 13 exceeds the reference temperature, this means that the temperature detection accuracy allowed for the thermistors 12 and 13 is exceeded. Accordingly, it is possible to determine that a failure has occurred in both or one of the thermistors 12 and 13.

While the first and second embodiments mentioned above are directed to the case where the temperature detecting circuit 10 or 30 is used for the purpose of detecting the temperature inside the high pressure gas tank 25 used for the fuel cell of an automobile, other than this use, the temperature detecting circuit 10 or 30 may be used for a tank used for a ship or stationary fuel cell. Further, the temperature detecting circuit 10 or 30 may be used in another container or environment in which the internal temperature fluctuates over a wide range, as in the case of compressed natural gas (CNG) or the like. While there are various types of such containers, the tank 25 is included as one type of such containers.

According to a first aspect of the embodiment, there is provided a temperature detecting circuit including a first thermistor that has a resistance Ra, a second thermistor that has a resistance Rb, a first pull-up resistor that is connected between the first thermistor and a power supply, the first pull-up resistor having a resistance Rc, a second pull-up resistor that is connected between the second thermistor and the power supply, the second pull-up resistor having a resistance Rd, and a controller configured to sense temperature by selecting a voltage signal from the first thermistor in a case in which a temperature corresponding to a voltage signal based on a temperature detected by one of the first thermistor and the second thermistor is below a threshold temperature that is determined in advance, and sense temperature by selecting a voltage signal from the second thermistor in a case in which the temperature corresponding to the voltage signal is higher than or equal to the threshold temperature. The resistances Ra, Rb, Rc, and Rd have a magnitude relationship expressed by Ra<Rb and Rc>Rd.

According to this configuration of the embodiment, the respective resistances Ra, Rb, Rc, and Rd of the first and second thermistors, and first and second pull-up resistors have a magnitude relationship expressed by Ra<Rb and Rc>Rd. Consequently, on the low temperature side blow the threshold temperature, the temperature detection accuracy of the first thermistor is better than the temperature detection accuracy of the second thermistor. Conversely, on the high temperature side higher than or equal to the threshold temperature, the temperature detection accuracy of the second thermistor is better than the temperature detection accuracy of the first thermistor.

Accordingly, the following control is executed by the controller. That is, in a case in which the temperature detected by one of the first and second thermistors is below the threshold temperature, temperature is sensed by selecting a voltage signal on the first thermistor side, and in a case in which the detected temperature is higher than or equal to the threshold temperature, temperature is sensed by selecting a voltage signal on the second thermistor side. According to this control, on the low temperature side below the threshold temperature, a voltage signal corresponding to a temperature detected by the first thermistor having a better detection accuracy than the second thermistor is acquired. A temperature on the low temperature side can be obtained with good accuracy from this voltage signal. Conversely, on the high temperature side higher than or equal to the threshold temperature, a voltage signal corresponding to a temperature detected by the second thermistor having a better detection accuracy than the first thermistor is acquired. A temperature on the high temperature side can be obtained with good accuracy from this voltage signal.

Therefore, even in a case in which the temperature at the target location fluctuates over a wide range from the low temperature of −50° C. to the high temperature of 90° C., the temperature can be detected with high accuracy. Because temperature is actually detected by only two elements, that is, two thermistors that are typically small in size, temperature detection can be achieved by means of a compact structure. Therefore, even if the target location is a narrow space such as the space inside an enclosed container, it is only necessary to dispose two thermistors inside the space. Consequently, problems such as difficulty of installation due to an increase in the overall size of the valve unit, and unnecessary restriction on spatial volume may be eliminated.

According to a second aspect of the embodiment, there is provided a temperature detecting circuit including a first thermistor that has a resistance Ra, a second thermistor that has a resistance Rb, a first pull-up resistor that is connected between the first thermistor and a power supply, the first pull-up resistor having a resistance Rc, a second pull-up resistor that is connected between the second thermistor and the power supply, the second pull-up resistor having a resistance Rd, and a controller configured to sense temperature by selecting a voltage signal from the first thermistor in a case in which a temperature corresponding to a voltage signal based on a temperature detected by one of the first thermistor and the second thermistor is below a threshold temperature that is determined in advance, and sense temperature by selecting a voltage signal from the second thermistor in a case in which the temperature corresponding to the voltage signal is higher than or equal to the threshold temperature. The resistances Ra, Rb, Rc, and Rd have a magnitude relationship expressed by Ra<Rb and Rc<Rd.

According to this configuration of the embodiment, even in a case in which the temperature at the target location fluctuates widely from low to high temperatures as in the case of the first aspect, the temperature can be detected with high accuracy. Further, the thermistors can sense a failure of each other with good accuracy. Moreover, temperature detection can be achieved by means of a compact structure using two thermistors that are typically small in size. Consequently, even if the target location is a narrow space, problems such as difficulty of installation and unnecessary restriction on spatial volume may be eliminated.

According to a third aspect of the embodiment, the threshold temperature is set to a temperature within a temperature range determined from a temperature value at which a detection accuracy of the first thermistor is better than a detection accuracy of the second thermistor, and a temperature value at which a detection accuracy of the second thermistor is better than a detection accuracy of the first thermistor, the temperature values being determined by comparing between a detection accuracy of the first thermistor and a detection accuracy of the second thermistor which are determined at each temperature, the detection accuracy being a difference between a detected temperature and an actual temperature.

According to this configuration of the embodiment, by using both the first thermistor and the second thermistor, the threshold temperature is set to a temperature that provides good detection accuracy over the entire range of temperatures. Therefore, on the low temperature side below the threshold temperature, temperature detected by the first thermistor whose temperature detection accuracy on the low temperature side is better than that of the second thermistor can be used. Conversely, on the high temperature side higher than or equal to the threshold temperature, temperature detected by the second thermistor whose temperature detection accuracy on the high temperature side is better than that of the first thermistor can be used. Consequently, even in a case in which temperature fluctuates widely from low to high temperatures, temperature can be detected with high accuracy by selectively using either one of the first and second thermistors depending on the threshold temperature.

According to a fourth aspect of the embodiment, the controller includes a memory configured to store a reference temperature that is determined in advance at predetermined temperature intervals, in association n with each of the predetermined temperature intervals, and a failure sensor configured to calculate, every time a temperature sensed from a voltage signal from one of the first and second thermistors becomes a temperature at each of the predetermined temperature intervals, a difference between temperatures sensed from voltage signals from both the first and second thermistors, and compare the difference with the stored reference temperature, the failure sensor determining that an offset failure has occurred in a case in which, as a result of this comparison, the difference that exceeds the reference temperature is obtained over a temperature range wider than a predetermined temperature range, and determining that a gain failure has occurred in a case in which the difference that exceeds the reference temperature is obtained over a specific temperature range narrower than a predetermined temperature range. According to this configuration, an offset failure or a gain failure of first and second thermistors can be determined appropriately.

According to a fifth aspect of the embodiment, the reference temperature is the largest of values that are obtained by combining and summing absolute values of temperature detection accuracy of the first and second thermistors at the predetermined time intervals. According to this configuration, for each predetermined temperature interval, the lowest of the temperature detection accuracies of the thermistors is set as the reference temperature. Therefore, if the difference between temperatures detected by the thermistors exceeds the reference temperature, this means that the temperature detection accuracy allowed for the thermistors is exceeded. Accordingly, it is possible to determine that a failure has occurred in both or one of the thermistors.

According to a sixth aspect of the embodiment, the first thermistor and the second thermistor are placed inside a container whose internal temperature fluctuates over a wide range as a fluid is filled into or released from the container. According to this configuration, temperature is actually detected by only two elements, that is, two thermistors that are typically small in size. Therefore, it is only necessary to dispose the two thermistors inside the container, which means that even if the container has a narrow internal space, installation is easy, and problems such as unnecessary restriction on spatial volume may be eliminated.

Obviously, numerous modifications and variations of the present invention are possible in light of the above teachings. It is therefore to be understood that within the scope of the appended claims, the invention may be practiced otherwise than as specifically described herein.

What is claimed is:

1. A temperature detecting circuit comprising:
   a first thermistor that has a resistance Ra;
   a second thermistor that has a resistance Rb;
   a first pull-up resistor that is connected between the first thermistor and a power supply, the first pull-up resistor having a resistance Rc;
   a second pull-up resistor that is connected between the second thermistor and the power supply, the second pull-up resistor having a resistance Rd; and
   a controller comprising circuitry configured to sense a temperature based on a voltage signal from the first thermistor if a temperature corresponding to a voltage signal from one of the first thermistor and the second thermistor is below a threshold temperature, the circuitry being configured to sense a temperature based on a voltage signal from the second thermistor if a temperature corresponding to a voltage signal from one of the first thermistor and the second thermistor is higher than or equal to the threshold temperature, the resistances Ra, Rb, Rc and Rd having a relationship expressed by Ra<Rb and Rc>Rd, wherein the controller includes
- a memory configured to store a reference temperature corresponding to each of predetermined temperature intervals, in association with each of the predetermined temperature intervals, and
- a failure sensor configured to calculate, every time a temperature sensed based on a voltage signal from one of the first thermistor and the second thermistor becomes a temperature at each of the predetermined temperature intervals, a difference between temperatures sensed from voltage signals from both the first thermistor and the second thermistor, and to compare the difference with the reference temperature,
- wherein the failure sensor determines that an offset failure has occurred if the difference that exceeds the reference temperature is obtained in a temperature range wider than a predetermined temperature range, and
- wherein the failure sensor determines that a gain failure has occurred if the difference that exceeds the reference temperature is obtained in a temperature range narrower than the predetermined temperature range.

2. The temperature detecting circuit according to claim 1, wherein the threshold temperature comprises a temperature within a temperature range determined from
- a first temperature value at which a detection accuracy of the first thermistor is better than a detection accuracy of the second thermistor, and
- a second temperature value at which a detection accuracy of the second thermistor is better than a detection accuracy of the first thermistor,
- wherein each of the first temperature value and the second temperature value is determined by comparing between a detection accuracy of the first thermistor and a detection accuracy of the second thermistor which are determined at each temperature, and
- wherein the detection accuracy comprises a difference between a detected temperature and an actual temperature.

3. The temperature detecting circuit according to claim 1, wherein the reference temperature comprises a maximum value among values that are obtained by combining and summing absolute values of temperature detection accuracy of the first thermistor and the second thermistor at predetermined time intervals.

4. The temperature detecting circuit according to claim 1, wherein the first thermistor and the second thermistor are placed inside a container whose internal temperature fluctuates when fluid is supplied into or released from the container.

5. A temperature detecting circuit comprising:
a first thermistor that has a resistance Ra;
a second thermistor that has a resistance Rb;
a first pull-up resistor that is connected between the first thermistor and a power supply, the first pull-up resistor having a resistance Rc;
a second pull-up resistor that is connected between the second thermistor and the power supply, the second pull-up resistor having a resistance Rd; and
a controller comprising circuitry configured to sense a temperature based on a voltage signal from the first thermistor if a temperature corresponding to a voltage signal from one of the first thermistor and the second thermistor is below a threshold temperature, the circuitry being configured to sense a temperature based on a voltage signal from the second thermistor if a temperature corresponding to a voltage signal from one of the first thermistor and the second thermistor is higher than or equal to the threshold temperature, the resistances Ra, Rb, Rc and Rd having a relationship expressed by Ra<Rb and Rc<Rd, wherein the controller includes
- a memory configured to store a reference temperature corresponding to each of predetermined temperature intervals, in association with each of the predetermined temperature intervals, and
- a failure sensor configured to calculate, every time a temperature sensed based on a voltage signal from one of the first thermistor and the second thermistor becomes a temperature at each of the predetermined temperature intervals, a difference between temperatures sensed from voltage signals from both the first thermistor and the second thermistor, and to compare the difference with the reference temperature,
- wherein the failure sensor determines that an offset failure has occurred if the difference that exceeds the reference temperature is obtained in a temperature range wider than a predetermined temperature range, and
- wherein the failure sensor determines that a gain failure has occurred if the difference that exceeds the reference temperature is obtained in a temperature range narrower than the predetermined temperature range.

6. The temperature detecting circuit according to claim 5, wherein the threshold temperature comprises a temperature within a temperature range determined from
- a first temperature value at which a detection accuracy of the first thermistor is better than a detection accuracy of the second thermistor, and
- a second temperature value at which a detection accuracy of the second thermistor is better than a detection accuracy of the first thermistor,
- wherein each of the first temperature value and the second temperature value is determined by comparing between a detection accuracy of the first thermistor and a detection accuracy of the second thermistor which are determined at each temperature, and
- wherein the detection accuracy comprises a difference between a detected temperature and an actual temperature.

7. The temperature detecting circuit according to claim 5, wherein the reference temperature comprises a maximum value among values that are obtained by combining and summing absolute values of temperature detection accuracy of the first thermistor and the second thermistor at predetermined time intervals.

8. The temperature detecting circuit according to claim 5, wherein the first thermistor and the second thermistor are placed inside a container whose internal temperature fluctuates when fluid is supplied into or released from the container.

* * * * *